US012802556B2

(12) United States Patent
Davis

(10) Patent No.: US 12,802,556 B2
(45) **Date of Patent: *Nov. 17, 2026**

(54) SYSTEM, METHOD, AND APPARATUS FOR ALERTING

(71) Applicant: Bryanna Davis, St. Augustine, FL (US)

(72) Inventor: Bryanna Davis, St. Augustine, FL (US)

( * ) Notice: Subject to any disclaimer, the term of this patent is extended or adjusted under 35 U.S.C. 154(b) by 14 days.

This patent is subject to a terminal disclaimer.

(21) Appl. No.: 19/182,699

(22) Filed: Apr. 18, 2025

(65) Prior Publication Data

US 2025/0246067 A1 Jul. 31, 2025

Related U.S. Application Data

(63) Continuation of application No. 18/342,734, filed on Jun. 28, 2023, now Pat. No. 12,307,879.

(51) Int. Cl.

| | |
|---|---|
| ***G08B 29/18*** | (2006.01) |
| ***G08B 21/02*** | (2006.01) |
| ***G08B 25/01*** | (2006.01) |
| ***G08B 25/10*** | (2006.01) |

(52) U.S. Cl.
CPC ....... *G08B 29/185* (2013.01); *G08B 21/0236* (2013.01); *G08B 25/016* (2013.01); *G08B 25/10* (2013.01)

(58) Field of Classification Search
CPC ......................... G08B 29/185; G08B 21/0236; G08B 25/016; G08B 25/10
See application file for complete search history.

(56) References Cited

U.S. PATENT DOCUMENTS

| | | | | |
|---|---|---|---|---|
| 5,838,237 | A | 11/1998 | Revell et al. | |
| 6,310,539 | B1 | 10/2001 | Rye et al. | |
| 6,807,564 | B1 | 10/2004 | Zellner et al. | |
| 7,084,771 | B2 | 8/2006 | Gonzalez | |
| 7,221,928 | B2 | 5/2007 | Laird et al. | |
| 7,251,470 | B2 | 7/2007 | Faucher et al. | |
| 7,312,709 | B2 | 12/2007 | Kingston | |
| 7,423,538 | B2 | 9/2008 | Gonzalez | |
| 7,486,194 | B2 | 2/2009 | Stanners et al. | |
| 8,249,547 | B1 | 8/2012 | Fener | |
| 8,538,370 | B2 | 9/2013 | Ray et al. | |
| 8,766,789 | B2 | 7/2014 | Cosentino | |
| 10,198,932 | B2 | 2/2019 | Ledingham | |
| 12,041,199 | B2 | 7/2024 | De Zarraga | |
| 12,307,879 | B2 * | 5/2025 | Davis | G08B 25/10 |

(Continued)

*Primary Examiner* — John A Tweel, Jr.

(57) ABSTRACT

A system for alerting includes several personal devices. Each personal device has logic, an activation switch, and a wireless transmitter. The logic causes the wireless transmitter to send a wireless transmission responsive to operation of the activation switch. There are several classroom devices (e.g., in a building). Each of the classroom devices has a processor, non-transitory memory, a transceiver, a way to communicate with a central server computer, and software. Responsive to receiving the wireless transmission from the personal device, the classroom device forwards the alert to the central server computer. When server software that runs on a processor of the central server computer receives the alert from one of the classroom devices, the server software counts total alerts and if the total alerts exceed a total alert threshold within a requisite amount of time, the server software signaling an alarm.

19 Claims, 14 Drawing Sheets

(56) References Cited

U.S. PATENT DOCUMENTS

| | | | |
|---|---|---|---|
| 2005/0101314 | A1 | 5/2005 | Levi |
| 2005/0197112 | A1 | 9/2005 | Yang et al. |
| 2007/0008127 | A1 | 1/2007 | Jakobsen |
| 2007/0082652 | A1 | 4/2007 | Hartigan et al. |
| 2008/0214142 | A1 | 9/2008 | Morin et al. |
| 2012/0154155 | A1 | 6/2012 | Brasch |
| 2012/0178410 | A1 | 7/2012 | Singhal |
| 2021/0168581 | A1 | 6/2021 | Van Den Dungen |
| 2024/0346912 | A1 | 10/2024 | Leahy |

* cited by examiner

SYSTEM, METHOD, AND APPARATUS FOR ALERTING

BACKGROUND OF THE INVENTION

Classroom safety has hit an all-time low. As of this writing, the number one cause of death for children is gun shot wounds. There have been many examples of an active shooter entering schools (elementary schools, middle schools, high schools, colleges) and shooting multiple children, staff, educators, police officers, etc.

Today, many students have cellular phones, and some have been used to report such shootings, but in the chaos of being shot at, it is often difficult for the students and faculty to make an emergency call as they are often huddled for cover, staying quiet in a safe place, or running. Activating a smartphone will generate light that might be seen by the active shooter and the person activating their smartphone may be the next target. Therefore, due to haste or fear, it often takes time before one or more students make emergency calls and then, the calls are often made to a parent, which further delays dispatching of the necessary authorities.

Further, false alarms are an issue with present systems, even with E911. When a person/student alone issues an alert, the person/student may be wrong as per the severity of the alert or may be mischievous. For example, after watching too much cable news last night, the person/student hears a backfire and thinks they hear a gun shot, immediately generating an alert either by calling 911 or any other alerting system. This call or alert results in maybe 100 police officers arriving at the location (e.g., school) with guns drawn, K-9 dogs, swat teams, etc. In all the confusion that results, it is possible that a person/student or police officer might get hurt. Even if nobody gets physically hurt, the traumatic stress of this happening will often affect many students, instilling fear of what might have happened. Further, with all these police officers at the location of the alert, the safety and well-being of others that may need those police officers at a different location is in jeopardy.

What is needed is a system, method, and apparatus that will quickly summon help while keeping false alarms to a minimum.

SUMMARY OF THE INVENTION

The system method, and apparatus for alerting (quickly summoning help) includes a personal device (e.g., body worn device or carried device) that, when activated by a switch, signal that the holder of such device (e.g., a student) believes there is a situation (e.g., an active shooter). The device is battery powered and communicates wirelessly to a local receiver (e.g., a classroom device). When the local receiver receives a signal from one or more of the personal devices, an algorithm is used to process the signal to determine a response which can be anything from dispatching an administrator or local security officer to signaling the local police force. To reduce false alarms, one or two features are provided. A first false-alarm-reducing feature is to require several repeated activations of the switch on the personal device within a certain time period. For example, the user/student must press a button on the personal device three times within 8 seconds to activate their assigned personal device. This will reduce the number of false alarms due to the person/student accidentally pressing the button or the button getting bumped. A second false-alarm-reducing feature is to require several of the personal devices to be activated (e.g., issue an alert) within another time period, for example, if three users/students issue an alert within 40 seconds, then an escalation to local law enforcement is made.

In one embodiment, a system for alerting is disclosed including several personal devices. Each personal device has logic, an activation switch, and a wireless transmitter. The logic causes the wireless transmitter to send a wireless transmission responsive to operation of the activation switch. There are one or more classroom devices (e.g., for locating throughout a building). Each of the classroom devices has a processor, non-transitory memory, a transceiver, means for communicating with a central server computer, and software running on the processor from the non-transitory memory. Responsive to receiving the wireless transmission from the personal device, the classroom device forwards the alert to the central server computer. When server software that runs on a processor of the central server computer receives the alert from one of the classroom devices, the server software counts total alerts and if the total alerts exceed a total alert threshold within a requisite amount of time, the server software signaling an alarm.

BRIEF DESCRIPTION OF DRAWINGS

The invention can be best understood by those having ordinary skill in the art by reference to the following detailed description when considered in conjunction with the accompanying drawings in which.

DETAILED DESCRIPTION OF THE INVENTION

Figure 1:
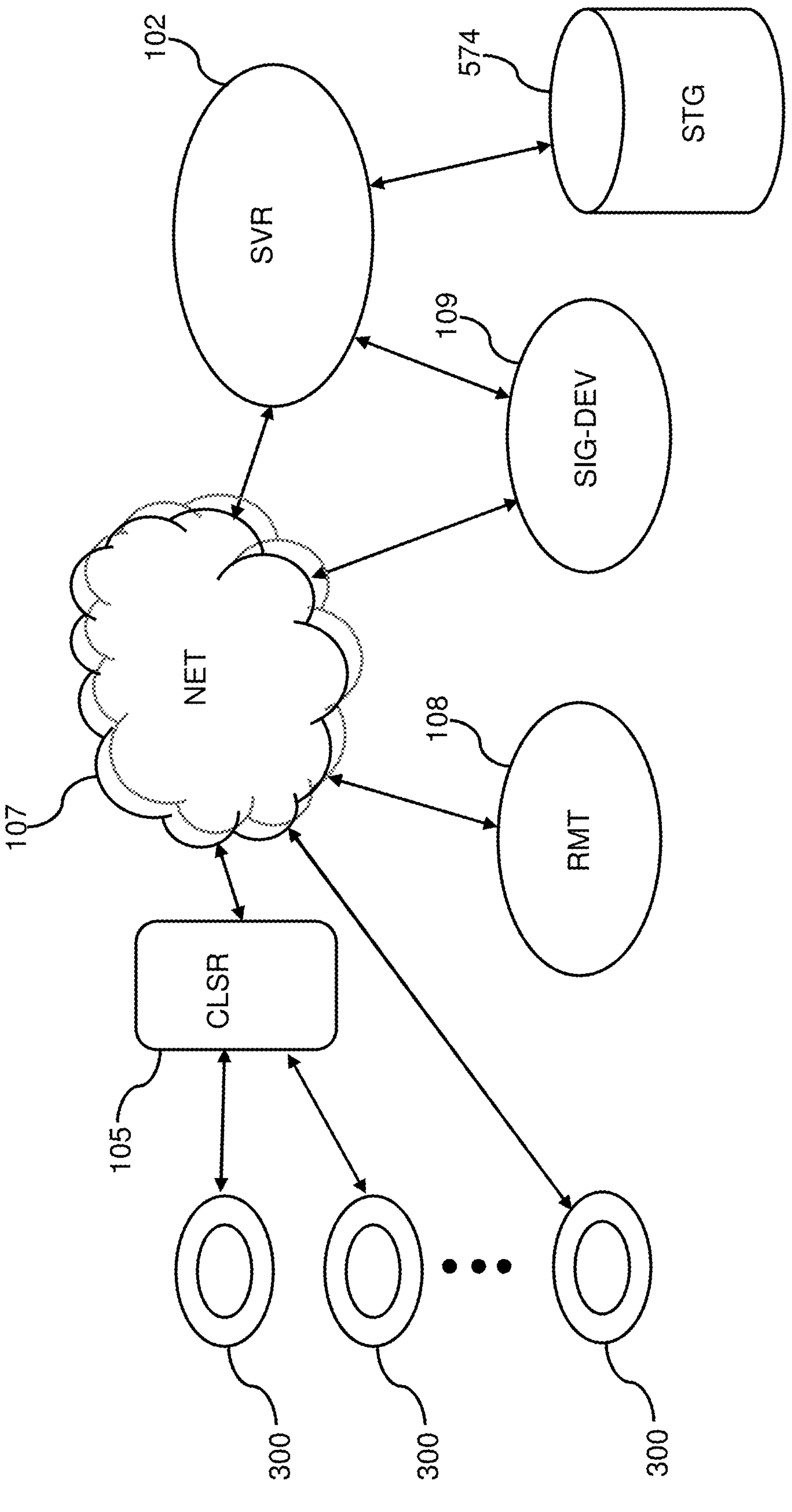
FIG. 1 illustrates a data connection diagram of the system for alerting.

Reference will now be made in detail to the presently preferred embodiments of the invention, examples of which are illustrated in the accompanying drawings. Throughout the following detailed description, the same reference numerals refer to the same elements in all figures.

In general, the system for alerting provides capabilities to determine with reasonable certainty that an emergency exists (e.g., an active shooter) and notifies authorities of such, while minimizing false alarms.

Referring to FIG. 1, a data connection diagram of the system for alerting. In this example, there are multiple personal devices 300. As will be shown, each personal device 300 has the ability to transmit an alert signal to one or more receiving devices, shown here as classroom device 105. The classroom device 105 receives the alert signals and forwards the alert signal to a central server computer 102, for example, through a data network 107. The central server computer 102 receives the alert signal(s) from one or more personal devices 300 and one or more classroom devices 105 and determines if there is a situation that requires a response. If a response is required, the central server computer 102 initiates the response, for example, communicating to a remote system 108 such as a law enforcement center or communicating to a signaling device(s) 109 (e.g., an alarm) either directly connected to the central server computer 102 or connected to the central server computer 102 through the data network 107.

The data network 107 is any wired or wireless network or combinations of networks that provide data communications between the classroom devices, the central server computer 102, the remote system(s) 108, optional signaling device(s) 109, and any other computing systems. The server has storage persistent memory 574 (e.g., storage such as disk, flash, cloud storage) for storing data such as history of alert signals, user/student data, programs, etc.

Figure 2:
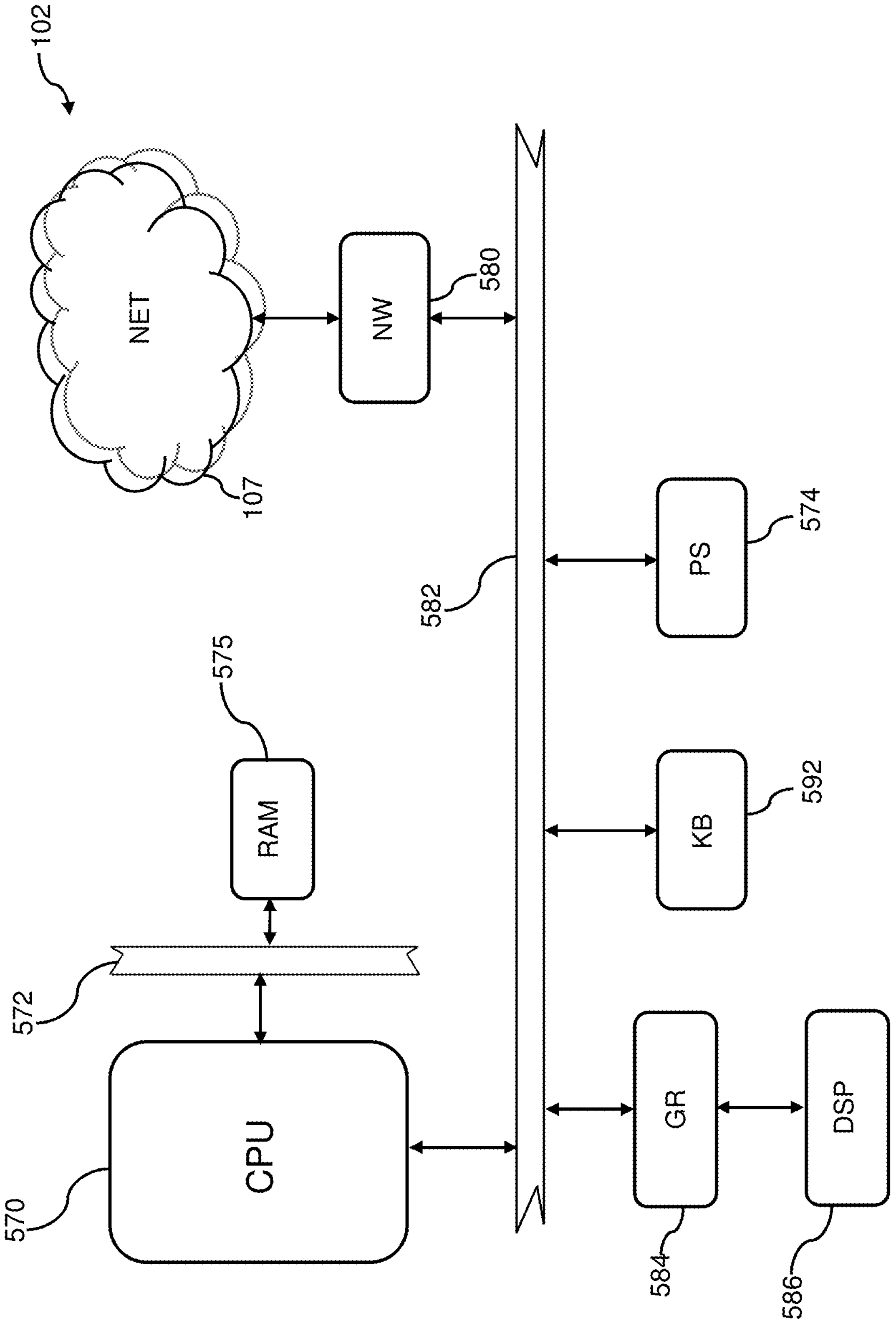
FIG. 2 illustrates a schematic view of a typical computer system such as a server as used in the system for alerting.

Referring to FIG. 2, a schematic view of a typical computer (e.g., central server computer 102) is shown. The example computer system represents a typical computer system used for back-end processing, generating reports, displaying data, etc. This central server computer 102 is shown in its simplest form as different architectures are known that accomplish similar results in a similar or different fashion and the present invention is not limited in any way to any particular computer system architecture or implementation. In some embodiments, the central server computer 102 is part of an array of server computers, in some embodiments, a cloud computing resource.

In this exemplary computer system, a processor 570 executes or runs programs in a random-access memory 575. The programs are generally stored within a persistent memory 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 is typically interfaced to the processor 570 through a system bus 582, or any other interface as known in the industry.

Also shown connected to the processor 570 through a system bus 582 is a network interface 580 (e.g., for connecting to a data network 107) that is wired, wireless, or both, and an optional graphics adapter 584 and a keyboard interface 592 (e.g., Universal Serial Bus—USB). The network interface 580 communicates wired or wirelessly using any known or future radio frequency band(s) and protocols including, but not limited to Wi-Fi, Ethernet, TDMA, CDMA, 5G, and LTE. The graphics adapter 584 receives commands from the processor 570 and controls what is depicted on a display image on the display 586. The keyboard interface 592 provides navigation, data entry, and selection features.

In general, some portion of the persistent memory 574 is used to store programs, executable code, and other data, etc.

The peripherals are examples and other devices are known in the industry such as speakers, microphones, USB interfaces, Bluetooth transceivers, Wi-Fi transceivers, image sensors, temperature measuring devices, etc., the details of which are not shown for brevity and clarity reasons.

Figure 3:
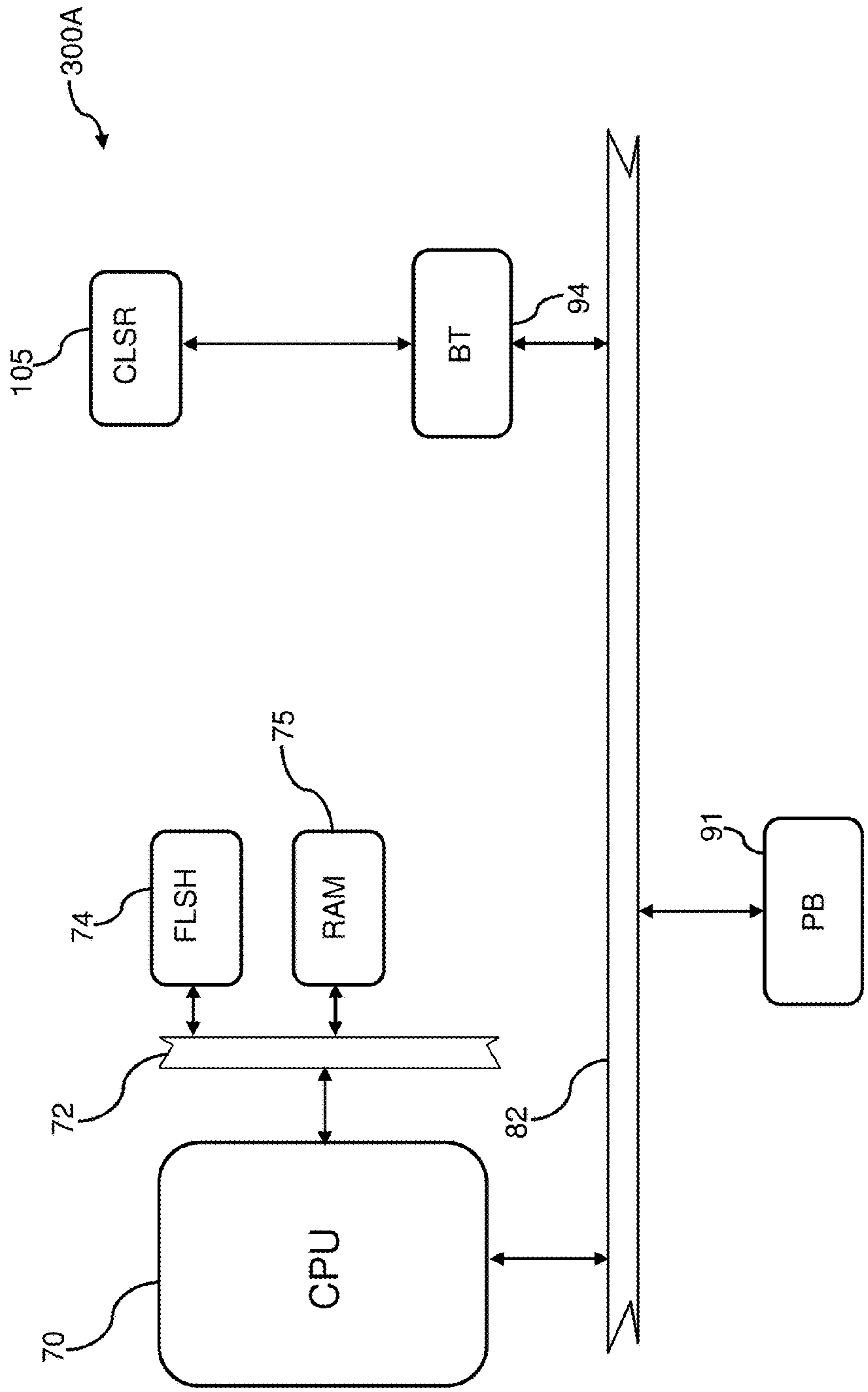
FIG. 3 illustrates a schematic view of a personal device of the system for alerting.

Referring to FIG. 3, a schematic view of a personal device 300 is shown. In general, the personal device 300 includes an activation switch 91, a transmitter 94 (or transceiver), and logic or processing to determine when to transmit an alert signal. In this embodiment, the personal device 300 is a processor-based personal device 300A. The processor-based personal device 300A is shown in a typical form. Different architectures are known that accomplish similar results in a similar fashion and the present invention is not limited in any way to any particular processor-based personal device 300A system architecture or implementation. In this exemplary processor-based personal device 300A, a processor 70 executes or runs programs in a random-access memory 75. The programs are generally stored within a persistent memory 74 and loaded into the random-access memory 75 when needed, though the programs are also anticipated to run directly from the persistent memory 74. The processor 70 is any processor, typically a processor designed for low-power systems. The persistent memory 74 and random-access memory 75 are connected to the processor 70, for example, by a memory bus 72, though they are often embedded as a single chip processor. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc.

Also connected to the processor 70 is a system bus 82 for connecting to peripheral subsystems such as a network interface 94 and an activation button 91. In some embodiments, the activation button 91 is directly connected to an input port of the processor 70. Likewise, in some embodiments, the network interface 94 is connected to input/output ports of the processor 70.

The network interface 94 connects the processor-based personal device 300A to the classroom device 105 through any wireless band and protocol such as Bluetooth, Wi-Fi, or a proprietary transmission band/protocol. There is no limitation on the type of wireless connection used and the wireless connection is anticipated to be either one-way, transmit-only in which the network interface 94 is a transmitter or bi-directional in which the network interface 94 is a transceiver.

Note that all personal devices 300 are enclosed in an enclosure that includes a power source such as a primary battery, rechargeable battery, capacitor, and mechanism to replace and/or recharge the battery/capacitor or other power storage device.

Figure 4:
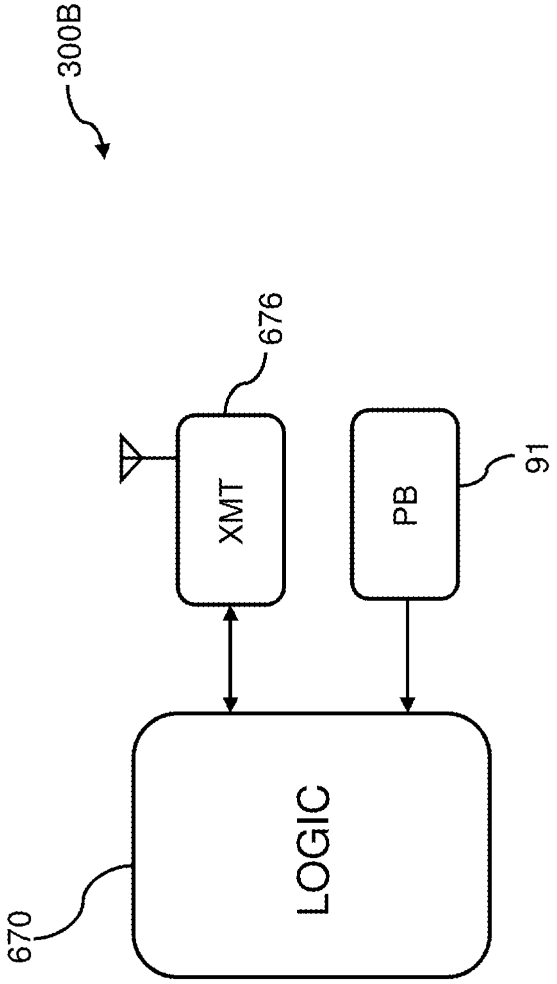
FIG. 4 illustrates a schematic view of an alternate personal device of the system for alerting.

Referring to FIG. 4, a second schematic view of a personal device 300 is shown. In this embodiment, the personal device 300 is a logic-based personal device 300B. The logic-based personal device 300B is shown in a typical form. Different architectures are known that accomplish similar results in a similar fashion and the present invention is not limited in any way to any particular logic-based personal device 300B system architecture or implementation. In this exemplary logic-based personal device 300B, logic 670 (e.g., discrete logic or a logic array) monitors the activation button 91 and, responsive to status of the activation button 91, activates the transmitter 676 to sent the alert signal.

The transmitter 676 connects the logic 670 of the logic-based personal device 300B to the classroom device 105 through any wireless band and protocol such as Bluetooth, Wi-Fi, or a proprietary transmission band/protocol. There is no limitation on the type of wireless connection used and the wireless connection is anticipated to be either one-way, transmit-only in which the transmitter 676 is transmit-only or bi-directional in which the transmitter 676 is a two-way transceiver.

Figure 5:
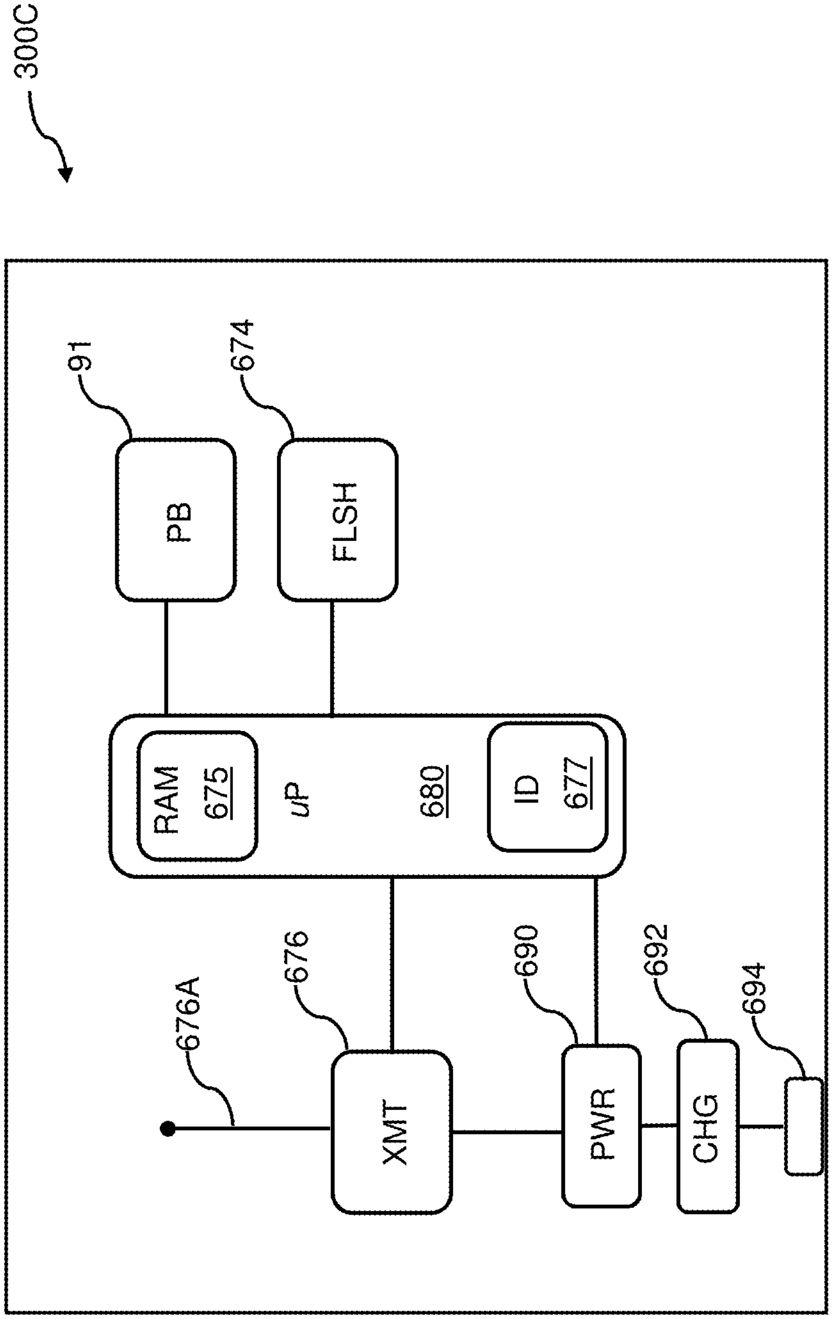
FIG. 5 illustrates a schematic view of yet another alternative personal device of the system for alerting.

Referring to FIG. 5, a third schematic view of a personal device 300 is shown. In this embodiment, the personal device 300 is a micro-controller-based personal device 300C. The micro-controller-based personal device 300C is shown in a typical form. Different architectures are known that accomplish similar results in a similar fashion and the present invention is not limited in any way to any micro-controller-based personal device 300C system architecture or implementation. In this exemplary micro-controller-based personal device 300C, a micro-controller 680 executes or runs programs in an internal random-access memory 675. The programs are generally stored within a persistent memory that is either internal or external flash memory 674 and loaded into the internal random-access memory 675 when needed or executed directly from the internal or external flash memory 674. The micro-controller 680 is any micro-controller, typically a micro-controller designed for low-power systems.

The activation button 91 is directly connected to an input port of the micro-controller 680.

The transmitter 676 connects the logic-based personal device 300B to the classroom device 105 through any wireless band and protocol such as Bluetooth, Wi-Fi, or a proprietary transmission band/protocol. There is no limitation on the type of wireless connection used and the wireless connection is anticipated to be either one-way, transmit-only in which the transmitter 676 is transmit-only or bi-directional in which the transmitter 676 is a two-way transceiver. In some embodiments, the transmitter 676 is a simple, AM or FM radio transmitter operating at any band, in particular, an unlicensed band.

In the embodiment shown, a power source 690 is included (e.g., a battery, chargeable battery, capacitor, super-capacitor) and, if rechargeable, a charge circuit 692 and charge connector 694. The power source 690 provides power to the transmitter 676 and micro-controller 680.

In some embodiments, the personal device 300, in this example, micro-controller-based personal device 300C, includes an identification 677 having a unique value across the enterprise (e.g., school, university) that uniquely identifies the source of the alert signal. In such, when the activation switch 91 is operated and an alert signal is transmitted from the transmitter 676 (through the antenna 676A), the value of the identification 677 is included in the transmission such that, when received at the classroom device 105 and forwarded to the central server computer 102, the central server computer 102 is able to identify the person/student responsible for signaling the alert.

Figure 6:
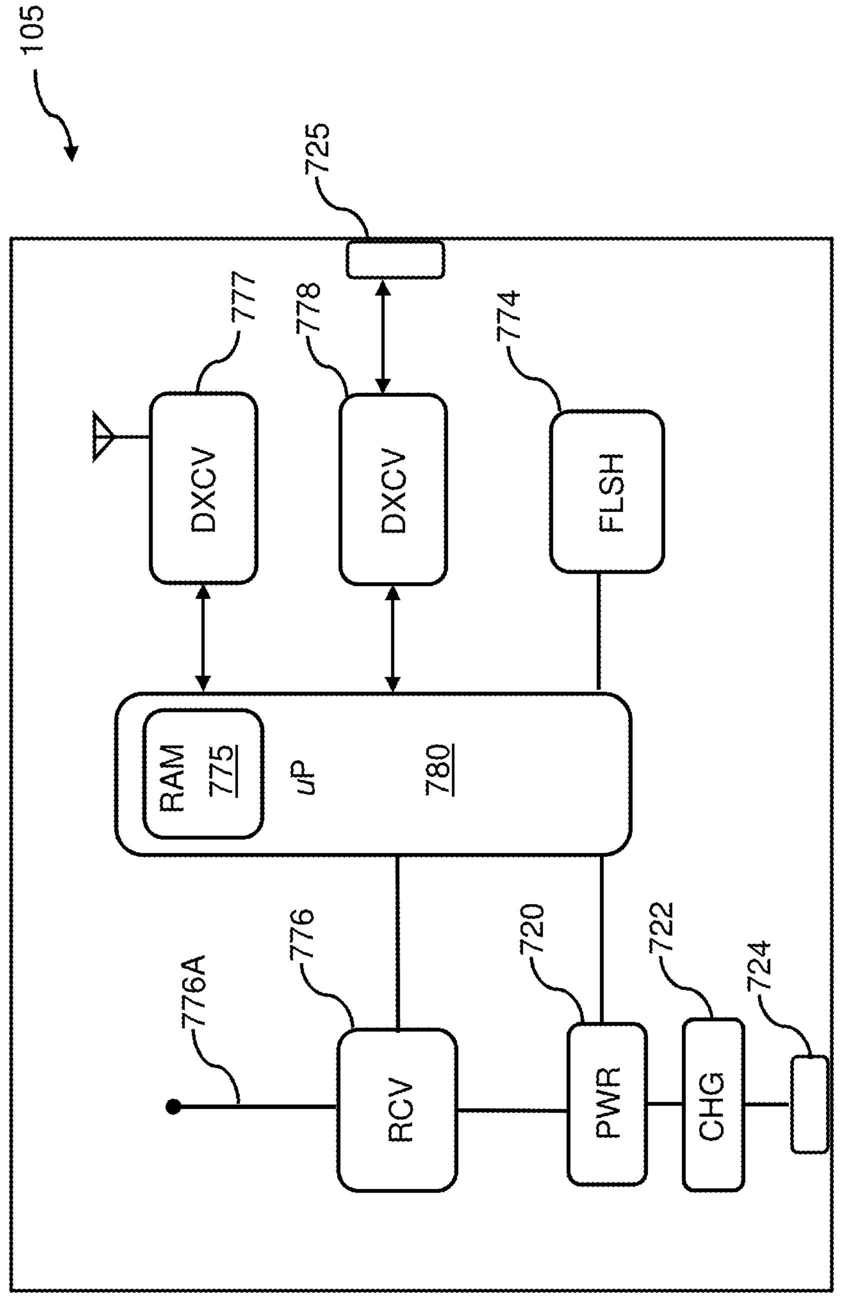
FIG. 6 illustrates a schematic view of an exemplary classroom device of the system for alerting.

Referring to FIG. 6, a schematic view of a classroom device 105 is shown. Although it is fully anticipated that the classroom device 105 be any computing device located in or near a room for which coverage is provided (e.g., a personal computer or smartphone), in this embodiment, the classroom device 105 is micro-controller-based. This exemplary classroom device 105 is shown in a typical form. Different architectures are known that accomplish similar results in a similar fashion and the present invention is not limited in any way to any specific classroom device 105 system architecture or implementation. In this example, a micro-controller 780 executes or runs programs in an internal random-access memory 775. The programs are generally stored within a persistent memory that is either internal or external flash memory 774 and loaded into the internal random-access memory 775 when needed or executed directly from the internal or external flash memory 774. The micro-controller 780 is any micro-controller, typically a micro-controller designed for low-power systems.

The receiver 776 and antenna 776A connects the classroom device 105 to one or more personal device 300 through any wireless band and protocol such as Bluetooth, Wi-Fi, or a proprietary transmission band/protocol. There is no limitation on the type of wireless connection used and the wireless connection is anticipated to be either one-way, receive-only in which the receiver 776 is receive-only or bi-directional in which the receiver 776 is a two-way transceiver. In some embodiments, the receiver 776 is a simple, AM or FM radio receiver operating at any band, in particular, an unlicensed band.

In the embodiment shown, an optional power source 720 is included (e.g., a battery, chargeable battery, capacitor, super-capacitor) for operation when power is lost and, if rechargeable, a charge circuit 722 and power connector 724. Power is provided through the power connector 724 (e.g., connected to a power brick) or through the wired network connector 725 (e.g., using power-over-ethernet). The power source 720 provides power to the receiver 776 and micro-controller 780.

For communications between the classroom device 105 and the central server computer 102, one or more network interfaces 777/778 are provided. In some embodiments, a wireless data interface 777 is provided. In some embodiments, a wired data interface 778 is provided, connecting to a wired network through the wired network connector 725. In some embodiments, both the wireless data interface 777 and wired data interface 778 are provided. The network interface(s) 777/778 communicate wired or wirelessly using any known or future radio frequency band(s) and protocols including, but not limited to Wi-Fi, Ethernet, TDMA, CDMA, 5G, and LTE.

Figure 7:
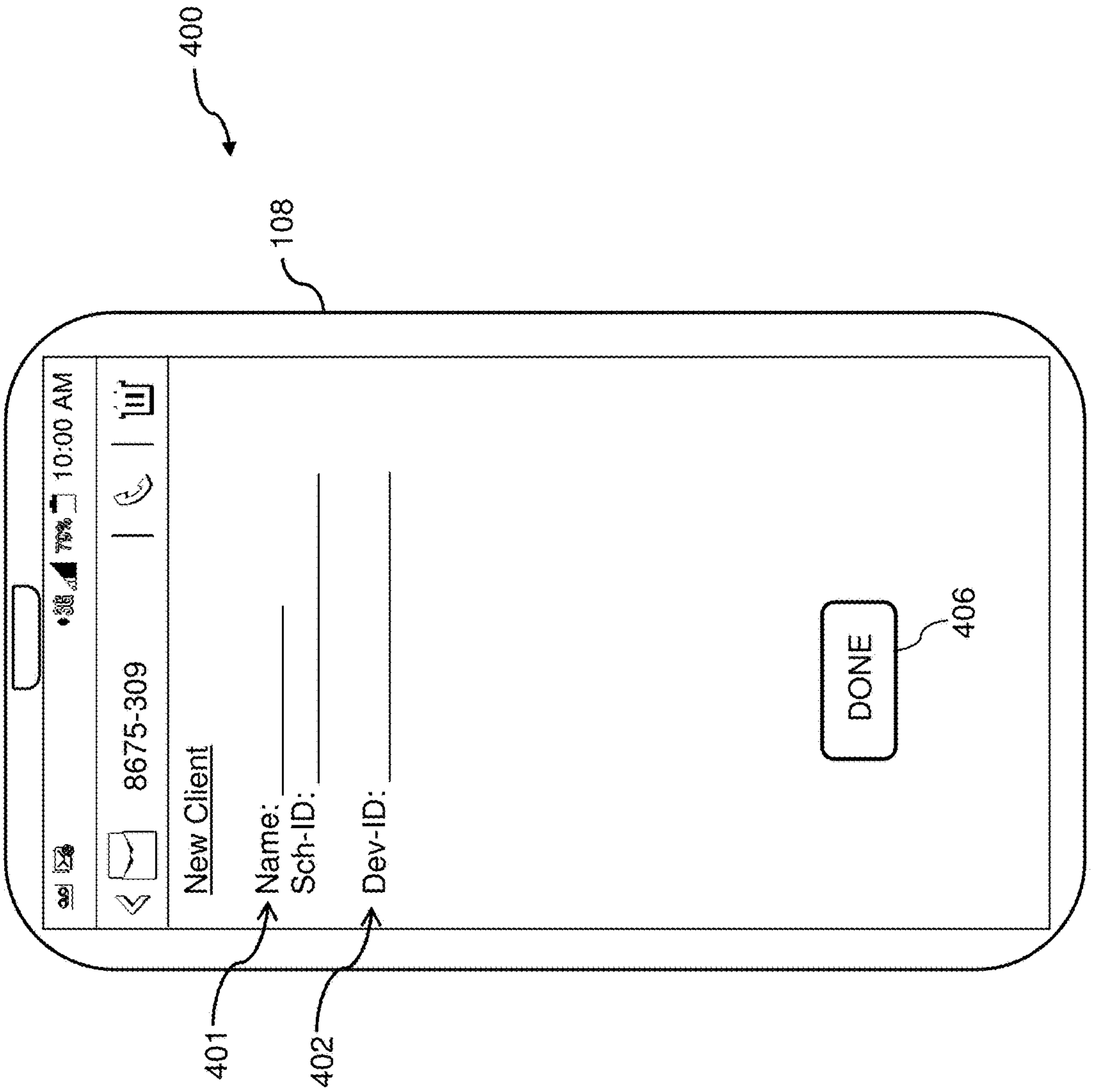
FIG. 7 illustrates a user interface for setup of the system for alerting.

Referring to FIG. 7, an exemplary administrative smartphone user interface 400 of the system for alerting is shown. Although many user interfaces are anticipated, one example user interface is a text input interface that is used to gather data from a person/student when person/student is issued a personal device 300.

Demographic information 401 is gathered from the person/student, for example, the name of the person/student and a student identification of the person/student.

Next the identification 677 of the personal device 300 that is to be assigned/given to the person/student is entered 402. By correlating the person/student to the identification 677 of the personal device 300, any false activations will be traceable back to that person/student.

Once the information for the person/student is complete, the "Done" function 406 is invoked and the information is saved and/or forwarded to the central server computer 102 for remote storage.

Figure 8:
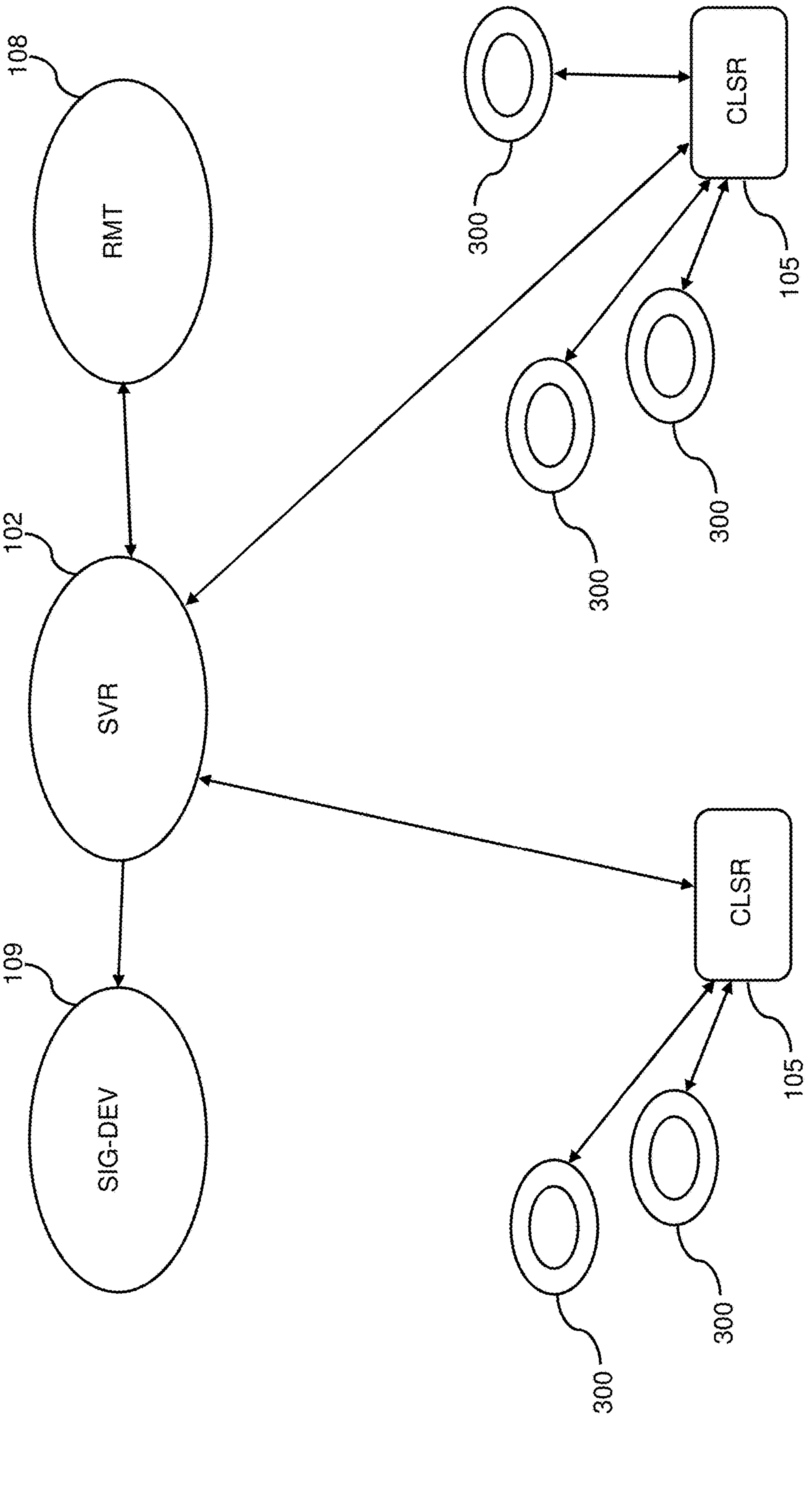
FIG. 8 illustrates a second data connection diagram of the system for alerting.

Referring to FIG. 8, a data connection diagram of the system for alerting is shown. In this example, there are multiple personal devices 300 and several classroom devices 105, though any number of either are fully anticipated. Each personal device 300 has the ability to transmit an alert signal to one or more classroom device 105, depending upon the location of the personal device 300 and each classroom device 105. The classroom device 105 receives the alert signals and forwards the alert signal to a central server computer 102. The central server computer 102 receives the alert signal(s) from one or more personal devices 300 and one or more classroom devices 105 and determines if there is a situation that requires a response. If a response is required, the central server computer 102 initiates the response, for example, communicating to a remote system 108 such as a law enforcement center or communicating to a signaling device(s) 109 (e.g., an alarm) either directly connected to the central server computer 102 or connected to the central server computer 102 through the data network 107. Note that, in some embodiments, it is anticipated that the alert signal is received by multiple classroom devices 105 due to the location of the personal device 300. In such, when the central server computer 102 receives the alert signal from multiple personal devices 300, the central server computer 102 checks to make sure that the alert signals are not duplicates (e.g., two alert signals from the same personal device 300) by way of either a time stamp (time received at the classroom devices 105) or by way of the identification 677 of the personal device 300 that sent the alert.

As it is anticipated that two or more classroom devices 105 will receive the alert from a single personal device 300, it is fully anticipated that the central server computer 102 will sort receptions of alerts by time received and/or by the identification 677 of the personal device 300 that sent the alert and dismiss duplicate alerts. For example, if a personal device 300 having the identification 677 of 12345 transmits an alert at 9:01:05 AM and the alert is received at two classroom devices 105, each will forward the alert to the central server computer 102 and the server will filter these alerts to indicate that only one alert was received based upon two alerts from the same personal device 300 (e.g., two alerts from the personal device 300 having identification 677 of 12345) or two alerts received at exactly the same time.

Figure 9:
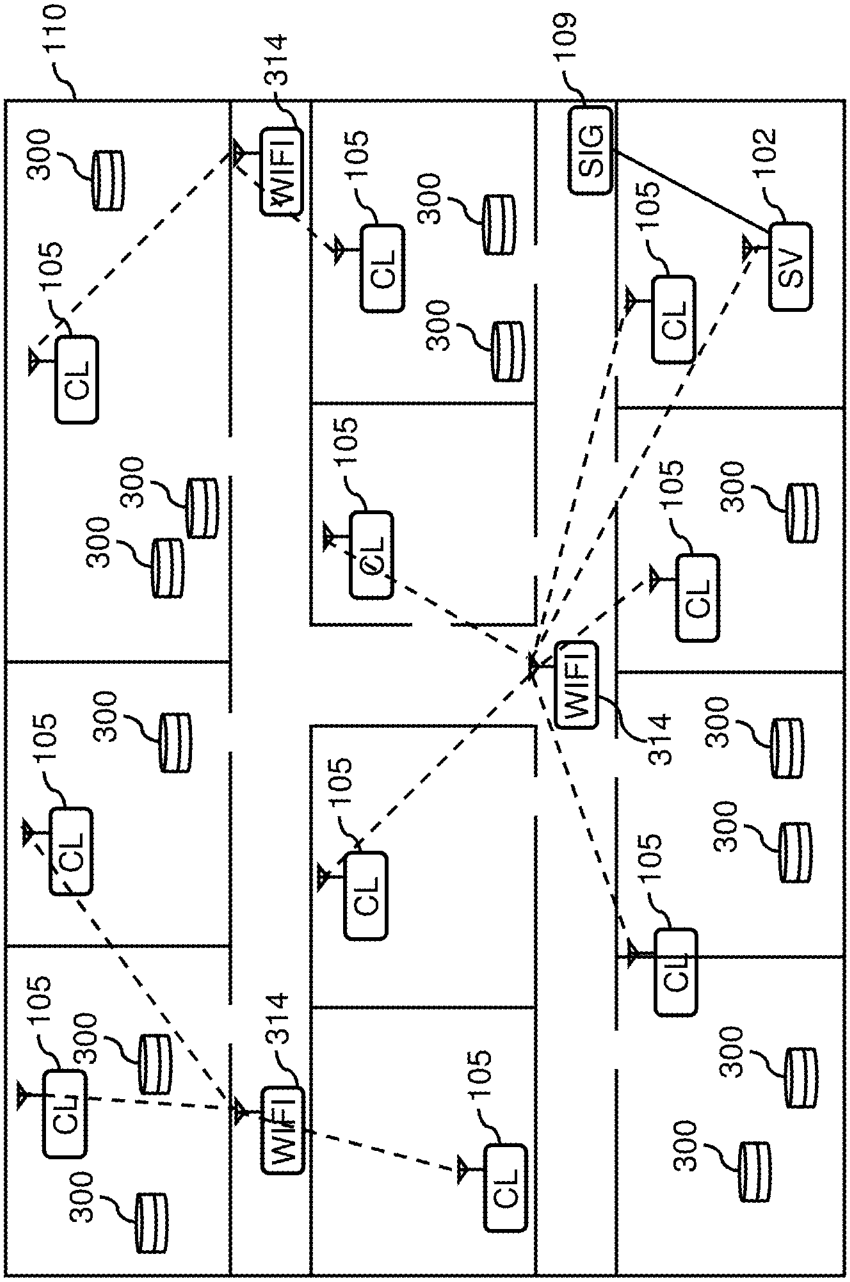
FIG. 9 illustrates a schematic view of a building having multiple personal devices and multiple classroom devices of the system for alerting.

Referring to FIG. 9, an exemplary building 110 (e.g., a school or university) is shown having multiple personal devices 300 and multiple classroom devices 105. The classroom devices 105 are shown connected to one of several Wi-Fi access points 314 (as known in the industry). The Wi-Fi access points 314 are connected to the central server computer 102 by Wi-Fi as well, though a wired connection such as Ethernet is fully anticipated. When a situation occurs, one or more people/students will activate their personal devices 300, sending an alert to one or more classroom devices 105, which, in turn, will send the alert to the central server computer 102 and the central server computer 102 will determine the severity of the situation and what actions are to be taken to escalate such as notifying internal resources (e.g., send a text to a staff member or safety officer), notifying external resources (e.g., send a transaction to a remote system(s) 108 and/or send a text to law enforcement), initiate the optional signaling device(s) 109, etc.

Figure 10:
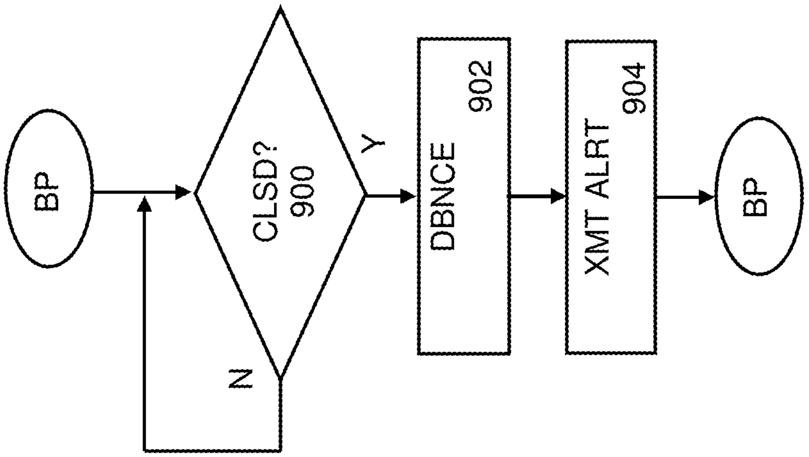
FIG. 10 illustrates an exemplary flowchart of the system for alerting.

Referring to FIG. 10, an exemplary implementation of the personal device is shown. In this embodiment, the personal device 300 is somewhat similar to the logic-based personal device 300B in which there is an activation switch 91. In this embodiment, the personal device 300 waits 900 until the activation switch 91 is operated (e.g., closed) then debounces 902 the activation switch 91 as mechanical switches often emit multiple open/close signals when activated, known as switch bounce. The debouncing reduces the chance that a single activation of the activation switch 91 will result in the transmission of more than one alert. Once the debounce 902 is complete, the alert is transmitted 904 to the classroom device 105 meaning that the activation switch 91 was operated one time.

Figure 11:
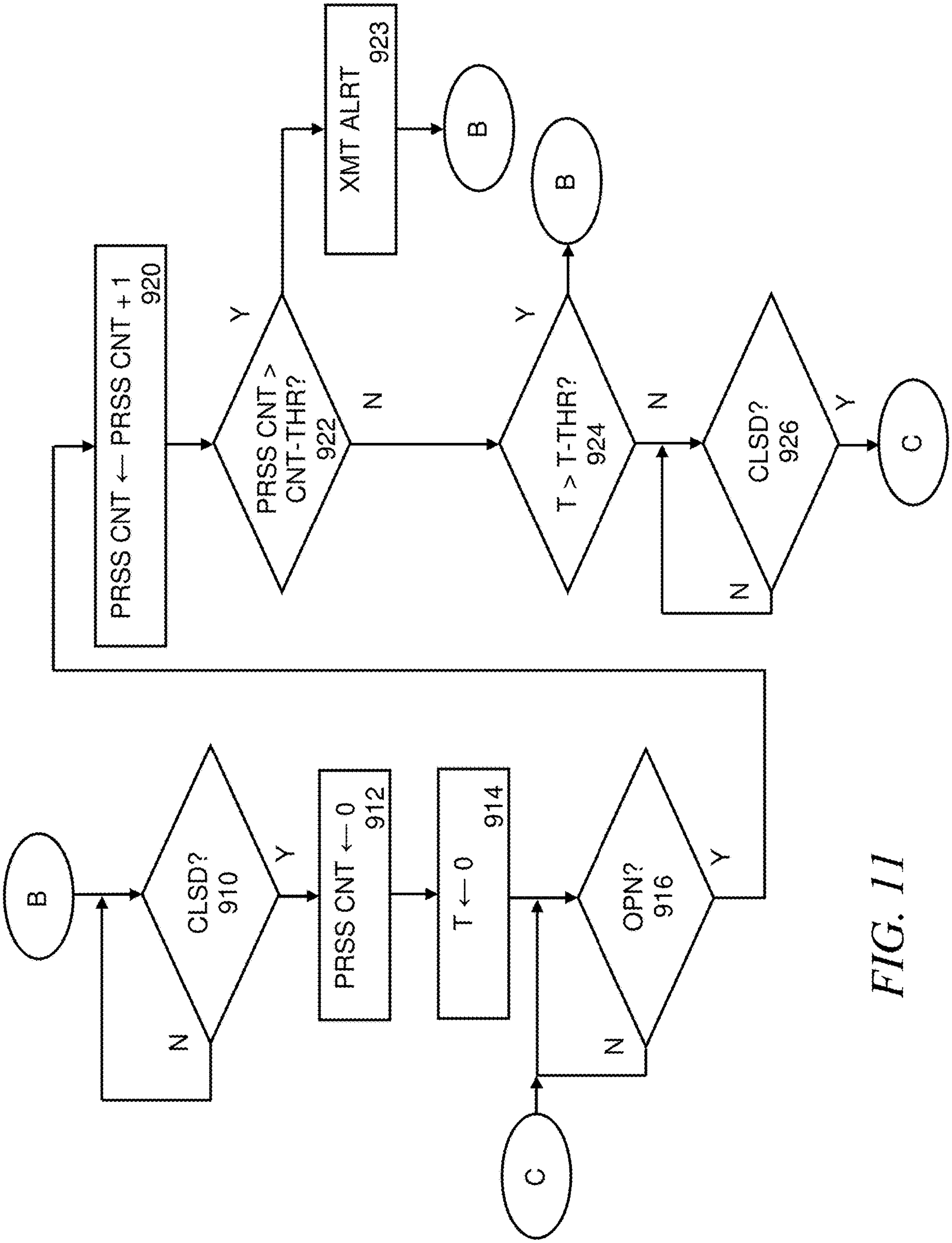
FIG. 11 illustrates an exemplary flowchart of the system for alerting.

Referring to FIG. 11, an exemplary implementation of the personal device is shown. In this embodiment, the personal device 300 is somewhat similar to the logic-based personal device 300B in which there is an activation switch 91. In this embodiment, the personal device 300 waits 910 until the activation switch 91 is operated (e.g., closed). When the activation switch 91 is operated 910 (e.g., opened or closed-closed is used in this example), a press count is cleared 912 and a timer is reset 914. The press count is used to determine if the correct number of subsequent operations of the activation switch 91 are made and the timer is used to determine if that number of operations are made within the requisite time period (e.g., three operations within 5 seconds).

Now an inner loop begins waiting for the activation switch 91 to revert back, or in this example, open 916. Once it is detected that the activation switch is open 916, the press count is incremented 920, indicating that a press (or operation) of the activation switch 91 has occurred. Now, if the press count is greater than a count threshold 922 (e.g., greater than 3 in the example above), the alert is transmitted 923 to the classroom device 105. In this example, the alert that goes to the classroom device 105 indicates that the requisite number of presses have been made (e.g., three presses) within the requisite time period. After the alert is transmitted 923, the above process starts over again.

If the press count is not greater that a count threshold (e.g., greater than 3 in the example above), the timer is compared to a timer threshold 924 (e.g., has 5 seconds elapsed since the first operation of the activation switch?) and if the timer has exceeded the timer threshold 924, the above process starts over, looking for the requisite number of operations of the activation switch 91 in the requisite time period.

If the timer has not exceeded the timer threshold 924, the personal device waits for the activation switch 91 to close again 926 and the inner loop continues.

Figure 12:
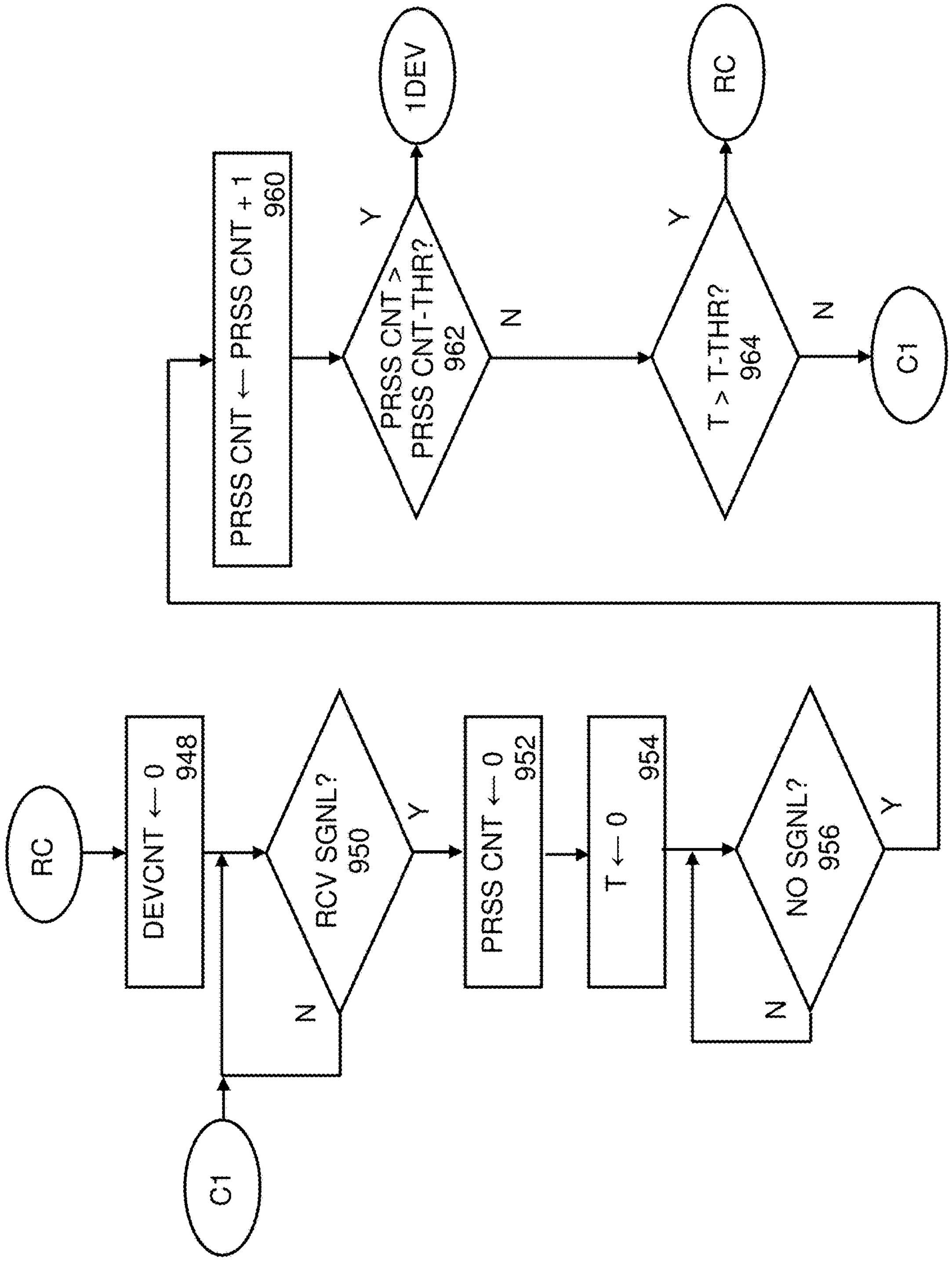
FIG. 12 illustrates an exemplary flowchart of the system for alerting.

Referring to FIG. 12, an exemplary implementation of the classroom device 105 is shown. In this embodiment, the personal device 300 transmits an alert while the activation switch 91 is operated. In this example, a device count is set to zero 948 (e.g., zero devices have signaled an alert yes). When the alert is received 950 from a personal device 300, a press count is cleared 952 and a timer is reset 954. Now the process waits 956 for the received signal to abate 956 (e.g., the person/student releases the activation switch 91 on the personal device 300). The press count is used to determine if the correct number of subsequent operations of the activation switch 91, and hence alert transmissions, are made and the timer is used to determine if that number of operations are made within the requisite time period (e.g., three operations within 5 seconds).

Figure 13:
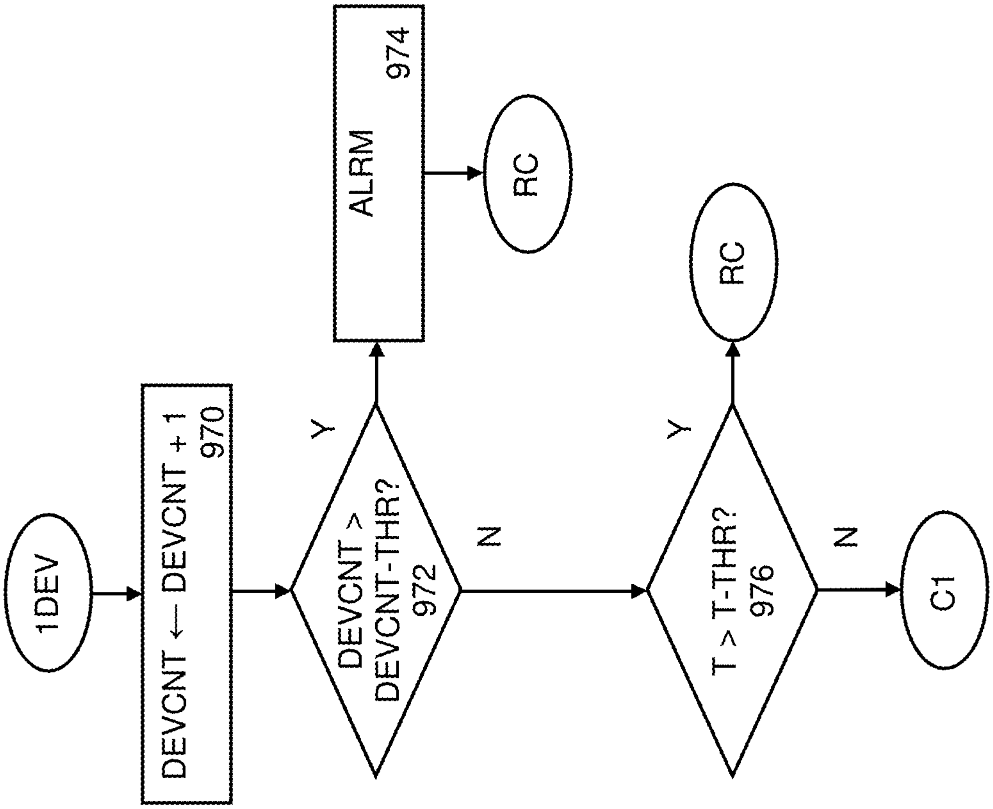
FIG. 13 illustrates an exemplary flowchart of the system for alerting.

Once it is detected that the received signal to abates 956, the press count is incremented 960, indicating that a press (or operation) of the activation switch 91 on the personal device 300 has abated. Now, if the press count is greater than a count threshold (e.g., greater than 3 in the example above) 962, flow proceeds at 1DEV (see FIG. 13), where the device count is incremented 970 and if the device count is greater than a device count threshold 972 (meaning that the requisite number of personal devices 300 have signaled an alert by operating the their activation switch 91 the requisite number of times), the alarm is made 974 (e.g., a signal is sent to law enforcement, and audible/visual alarm is sounded, a resource officer or staff member is notified). In this example, the alarm that goes to the central server computer 102 indicates that the requisite number of presses have been made (e.g., three presses) within the requisite time if the timer exceeds the time threshold 976 by the requisite number of personal devices 300. After the alarm is transmitted 974, the above process starts over again.

If the device count is not greater than a device count threshold 964, the timer is compared to the time threshold 976 (e.g., has 5 seconds elapsed since the first alert signal was received) and if the timer exceeds the time threshold 976 the above process resets and starts over.

If the timer has not exceeded the time threshold 976, the inner loop C1 continues. In some embodiments, the identification 677 of the personal device 300 and/or time of transmission are used to differentiate between personal devices 300 to make sure that operation of just one personal device 300 does not signal the alarm 974. Likewise, it is also anticipated that the above process be cloned for each personal device 300, looking for the requisite number of operations of the activation switch 91 within the requisite time period and such for the requisite number of personal devices 300.

Figure 14:
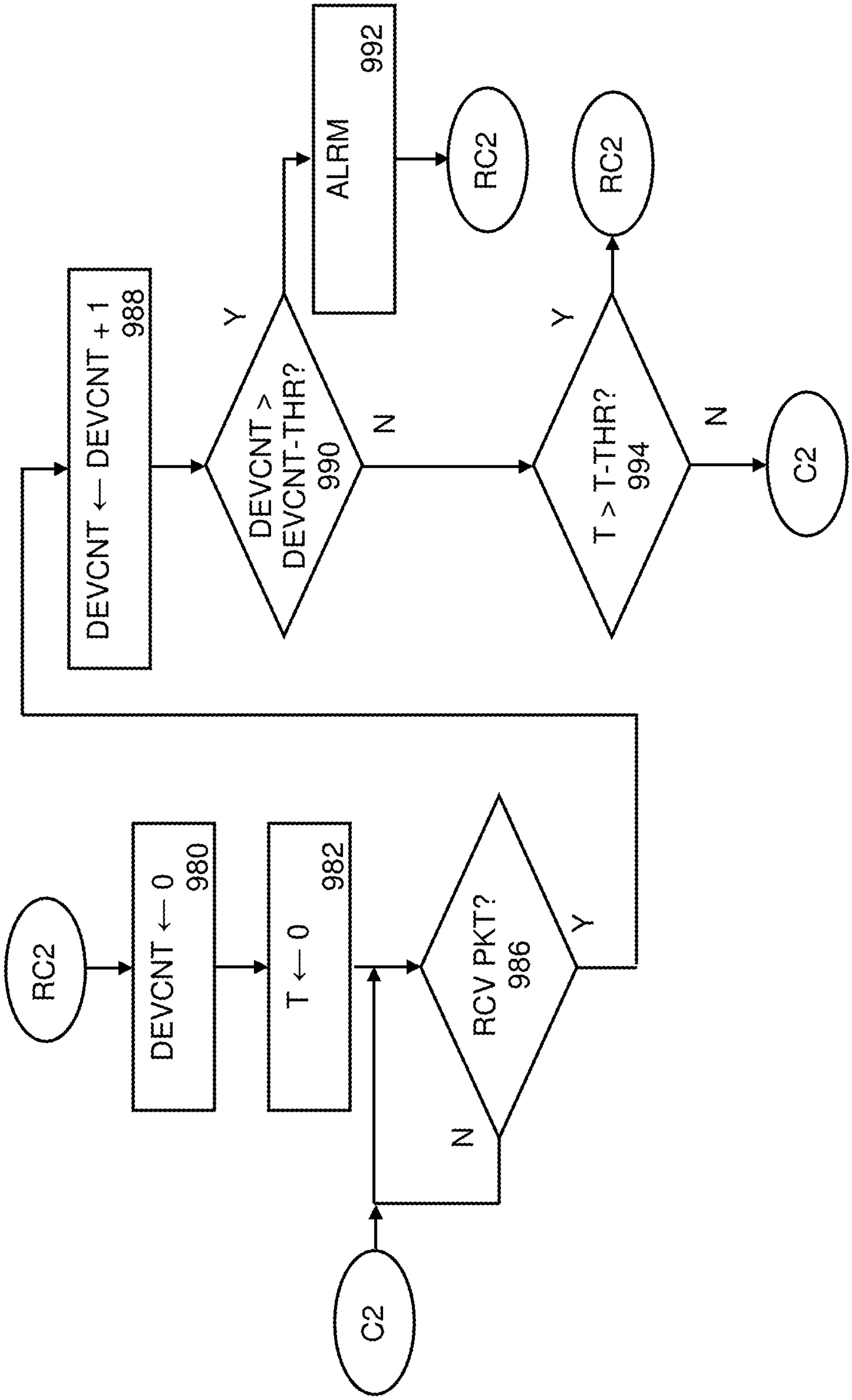
FIG. 14 illustrates an exemplary flowchart of the system for alerting.

Referring to FIG. 14, it is assumed that the personal device 300 has software similar to that of FIG. 11 and in such, the alert is not transmitted from the personal device 300 until the requisite number of operations of the activation switch 91 have occurred within the requisite time period. The program flow of FIG. 14 is performed by the classroom device 105 and/or the server computer 102. Therefore, the program flow starts with clearing a device count 980 and clearing a timer 982.

Now a loop begins waiting to receive a packet 986 such as an alert from one of the personal devices 300. When a packet is received 986 (meaning that the activation switch 91 of one specific personal device 300 was pressed the requisite number of times within the requisite amount of time), the device count is incremented 988. If the device count exceeds the requisite device count threshold 990, the alarm is initiated 992. If the device count does not exceed the requisite device count threshold 990, then the timer is checked and if the timer exceeds the time threshold 994, the process is restarted at the beginning (RC2) as the number of requisite personal devices 300 have not signaled activation within the requisite time period. When the timer is checked and the timer does not exceed the time threshold 994, the inner loop (C2) continues looking for reception of another packet 986 from another personal device 300.

In some embodiment, before the device count is incremented 988, it is determined if the identification 677 of the originator of the received packet 986 previously sent a prior received packet 986 and, if so, the device count is not incremented 988 so that multiple unique personal devices 300 must be activated in order to signal the alarm 992.

Note that it is anticipated that the press count, the time threshold and the device count threshold are preset and are changeable by way of administrative functions. It is also anticipated that the central server computer 102 has intelligence (e.g., fuzzy logic, artificial intelligence) and receives feedback from administrative personnel when each alarm is extinguished indicating whether the alarm was valid or a false alarm and the intelligence within the central server computer 102 automatically modifies the press count, the time threshold and the device count threshold to reduce false alarms while maintaining valid alarms.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

The invention claimed is:

1. A system for alerting, the system comprising:

a plurality of personal devices, each personal device of the plurality of personal devices having logic, an activation switch, and a wireless transmitter, the logic causes the wireless transmitter to send an alert by way of a wireless transmission responsive to more operations of the activation switch than a predetermined number of operations within a set time period; and server software running on a server processor of a central server computer, after receiving the alert from one of the plurality of personal devices, the server software counts total alerts and if the total alerts exceed a total alert threshold within a pre-determined amount of time, the server software signals an alarm.

2. The system for alerting of claim 1, wherein the predetermined number of operations is one.

3. The system for alerting of claim 1, wherein the alert is sent from one of the plurality of personal devices to a classroom device and the classroom device forwards the alert to the central server computer.

4. The system for alerting of claim 3, wherein the set time period is five seconds.

5. The system for alerting of claim 1, wherein the logic comprises a serial number and the logic includes the serial number in the wireless transmission, and the server software records the serial number with the alert.

6. The system for alerting of claim 5, wherein upon reception of one or more alerts, the server software deletes duplicate alerts that have a matching serial number.

7. The system for alerting of claim 1, wherein the total alert threshold is one.

8. The system for alerting of claim 1, wherein when the server software signals the alarm, the server software sends an alarm transaction to a law enforcement device.

9. A method of alerting comprising:

detecting pressing an activation switch of one or more personal devices a number of times within a set time period, the number of times being greater than one;

after detecting pressing of the activation switch on the one or more personal devices the number of times within the set time period sending an alert to a central server computer;

after receiving the alert at the central server computer, counting a number of alerts received from two or more personal devices within a pre-determined amount of time; and when the number of alerts exceed an alert threshold within the pre-determined amount of the time, initiating an alarm.

10. The method of claim 9, wherein the alert is sent to the central server computer over a data network.

11. The method of claim 9, wherein the alert is sent to a classroom device and the classroom device forwards the alert to the central server computer over a data network.

12. The method of claim 9, wherein the initiating of the alarm comprises transmitting a message to law enforcement.

13. The method of claim 9, wherein the set time period is five seconds.

14. The method of claim 9, wherein the two or more personal devices are differentiated by a serial number and after the pressing of the activation switch of the one or more personal devices the number of times within the set time period, sending the serial number of that one of the one or more personal devices.

15. A system for alerting, the system comprising:

a plurality of personal devices, each personal device of the plurality of personal devices comprising a processor, an activation switch, and a wireless transmitter; the processor causes the wireless transmitter to send an alert transaction responsive to a number of operations of the activation switch within a set time period, the number of operations is greater than or equal to one; and server software running on a server processor of a central server computer, after receiving the alert transaction from one of the plurality of personal devices, the server software counts total alert messages and if the total alert messages exceed a total alert threshold within a pre-determined amount of time, the server software signals an alarm.

16. The system for alerting of claim 15, wherein the plurality of personal devices send the alert transaction to a classroom device and the classroom device forwards the alert transaction to the central server computer.

17. The system for alerting of claim 15, wherein each personal device of the plurality of personal devices comprises a unique serial number and the unique serial number is encoded in the alert transaction and after receiving the alert transaction from any of the plurality of personal devices, the server software counts alert messages from each personal device and if the total alert messages from a pre-determined number of unique personal devices exceed a total alert threshold within the pre-determined amount of the time, the server software signals the alarm.

18. The system for alerting of claim 15, wherein the total alert threshold is one.

19. The system for alerting of claim 15, wherein when the server software signals the alarm, the server software sends an alarm transaction to a law enforcement device.

* * * * *